(12) United States Patent
Ono et al.

(10) Patent No.: US 8,076,396 B2
(45) Date of Patent: Dec. 13, 2011

(54) ULTRARAPID HARDENING CEMENT COMPOSITION AND DISPERSANT FOR ULTRARAPID HARDENING CEMENT COMPOSITION

(75) Inventors: Akira Ono, Osakasayama (JP); Hisashi Inokawa, Takarazuka (JP); Tsuyoshi Hirata, Kobe (JP); Hirokatsu Kawakami, Izumiotsu (JP); Masami Hattori, Takatsuki (JP)

(73) Assignees: Sumitomo Osaka Cement Co., Ltd, Tokyo (JP); Nippon Shokubai Co., Ltd, Osaka-Shi (JP)

( * ) Notice: Subject to any disclaimer, the term of this patent is extended or adjusted under 35 U.S.C. 154(b) by 0 days.

(21) Appl. No.: 12/065,443

(22) PCT Filed: Aug. 30, 2006

(86) PCT No.: PCT/JP2006/317592
§ 371 (c)(1), (2), (4) Date: Feb. 29, 2008

(87) PCT Pub. No.: WO2007/026936
PCT Pub. Date: Mar. 8, 2007

(65) Prior Publication Data
US 2009/0131560 A1    May 21, 2009

(30) Foreign Application Priority Data
Sep. 1, 2005 (JP) ................. 2005-253210

(51) Int. Cl.
| C04B 24/26 | (2006.01) |
| C04B 7/00 | (2006.01) |
| C04B 7/02 | (2006.01) |
| C08K 3/00 | (2006.01) |
| C08K 5/092 | (2006.01) |
| C08K 5/11 | (2006.01) |

(52) U.S. Cl. ............ 524/5; 524/2; 524/4; 524/376; 524/377; 524/556; 526/317.1; 526/318; 526/319

(58) Field of Classification Search ............ 524/5, 2, 524/4, 376, 377, 556; 526/317.1, 318, 319
See application file for complete search history.

(56) References Cited

U.S. PATENT DOCUMENTS

| 3,973,978 A * | 8/1976 | Nakagawa et al. ........... 106/694 |
| 2003/0125492 A1 | 7/2003 | Yamamoto et al. |
| 2005/0182162 A1 | 8/2005 | Hayashiya et al. |

FOREIGN PATENT DOCUMENTS

| JP | 7-017749 | | 1/1995 |
| JP | 11-217250 | | 8/1999 |
| JP | 2000-034159 | | 2/2000 |
| JP | 2000-063164 | | 2/2000 |
| JP | 2001-220417 | | 8/2001 |
| JP | 2003-073157 | | 3/2003 |
| JP | 200373158 | | 3/2003 |
| JP | 2005-200298 | * | 7/2005 |
| JP | 2006-037007 | * | 4/2006 |
| JP | 2006-097007 | * | 4/2006 |
| WO | WO-2005066095 | | 7/2005 |

OTHER PUBLICATIONS

Japanese Office Action dated Mar. 29, 2011 for counterpart Japanese Application No. 2006-232033.

* cited by examiner

Primary Examiner — James J Seidleck
Assistant Examiner — Deve E Valdez
(74) Attorney, Agent, or Firm — Connolly Bove Lodge & Hutz LLP

(57) ABSTRACT

To provide an ultrarapid hardening cement composition with high strength, the composition having: excellent fluidity; excellent usable time; and excellent initial strength under low temperature atmosphere as well as under general temperature atmosphere, and improving strength and durability of a hardening product of the composition. An ultrarapid cement hardening composition comprising: an ultrarapid hardening cement (A) comprising a calcium aluminate; and a cement dispersant (B), wherein the cement dispersant (B) comprises a copolymer having: a repeating unit derived from a monomer represented by the following formula (1) and formula (2) as defined in the specification.

9 Claims, No Drawings

ULTRARAPID HARDENING CEMENT COMPOSITION AND DISPERSANT FOR ULTRARAPID HARDENING CEMENT COMPOSITION

RELATED APPLICATIONS

This application is a national stage application (under 35 U.S.C. §371) of PCT/JP2006/317592 filed Aug. 30, 2006, which claims benefit of Japanese application 2005-253210 filed Sep. 1, 2005, disclosure of which is incorporated herein by reference.

TECHNICAL FIELD

The present invention relates to a cement composition having ultrarapid hardenability and a dispersant for ultrarapid hardening cement compositions. More specifically, the present invention relates to: an ultrarapid hardening cement composition which is used in applications such as repair and urgent construction in a civil engineering and construction field and can improve workability with retaining the rapid hardenability; and a dispersant for ultrarapid hardening cement compositions.

BACKGROUND ART

Ultrarapid hardening cement compositions are produced by kneading ultrarapid hardening cement, water, fine aggregate, coarse aggregate, and the like. Such ultrarapid hardening cement compositions are excellent in rapid hardenability and capable of providing hardened products excellent in strength and durability. Therefore, such ultrarapid hardening cement compositions have been widely used in repair, reinforcement, or urgent construction of outer wall materials of buildings, building structures, or the like, and in production of concrete products. Such ultrarapid hardening cement compositions need to have enough initial fluidity and fluidity retention not to affect the work, and need to be excellent in strength and durability after hardened as well as in rapid hardenability. Further, such ultrarapid cement compositions need to exhibit these properties under low temperature atmosphere because such compositions are often used in winter when the hardening rate reduces.

In such ultrarapid hardening cement compositions, cement containing a calcium aluminate as a rapid hardening component (ultrarapid hardening cement) has been commonly used. It is known that the calcium aluminate as a rapid hardening component rapidly hydrates with kneading water to exhibit excellent initial strength. On the other hand, the rapid hydration of the calcium aluminate rapidly reduces the fluidity of the cement composition and complicates the kneading. Therefore, the workability needs to be improved by controlling such a hydration reaction and thereby improving the fluidity retention and the usable time sufficiently. The unit quantity of water contained in such a cement composition is reduced, and thereby performances of a hardened product of the composition are improved. Therefore, the workability needs to be improved without increase of the unit quantity of kneading water.

Various dispersants have been added to improve properties of the ultrarapid hardening cement composition, such as initial fluidity and usable time, or the unit quantity of water contained in the cement composition has been reduced to improve strength of the hardening product.

Cement dispersants containing, as a main component, a formaldehyde condensate of naphthalene sulfonate, a formaldehyde condensate of melamine sulfonate, or the like, and polycarboxylic acid cement dispersants have been known as dispersants contained in conventional ultrarapid hardening cement compositions.

However, such dispersants containing, as a main component, a formaldehyde condensate of naphthalene sulfonate, a formaldehyde condensate of melamine sulfonate, or the like, show limited cement dispersion effect or limited fluidity improvement effect if the dosage thereof exceeds a certain amount. Therefore, a cement dispersant capable of providing needed high fluidity, low unit quantity of water, initial fluidity, usable time, dispersibility, and the like, has been needed.

The compositions need to have sufficient fluidity during the work. However, such dispersants containing, as a main component, a formaldehyde condensate of naphthalene sulfonate, a formaldehyde condensate of melamine sulfonate, or the like, may be insufficient in usable time. It is known that a retarding agent needs to be added to the composition in order to maintain the fluidity attributed to the use of the dispersant during the work. However, the retarding agent may reduce the initial strength exhibiting property of the ultrarapid hardening cement composition if added too much, particularly under low temperature. Therefore, an ultrarapid hardening cement composition capable of maintaining the fluidity for the work even if containing a small amount of or not containing such a retarding agent, has been needed. These cement dispersants may contain residual formaldehyde used in the synthetic process. Therefore, an economically preferable ultrarapid hardening cement composition has been needed.

It is known that the polycarboxylic acid cement dispersants have dispersion effect higher than that of the cement dispersants containing, as a main component, a formaldehyde condensate of naphthalene sulfonate, a formaldehyde condensate of melamine sulfonate, and the like, generally. Such polycarboxylic acid cement dispersants exhibit excellent dispersibility if used to an ordinary portland cement. Therefore, the polycarboxylic acid admixtures show excellent dispersibility and can dramatically highly flow without changing the unit quantity of water, or can remarkably reduced the unit quantity of water while retaining a certain fluidity. For example, disclosed is a cement composition including a hydraulic material consisting essentially of calcium aluminates having 0.5 to 4.0 molar ratio of $CaO/Al_2O_3$ and a cement dispersing agent consisting essentially of a polycarboxylic acid-based polymer. In Example, a polycarboxylic acid cement dispersant is used (for example, referring to Japanese Kokai Publication No. Hei-11-217250 (pages 2 to 4)).

With respect to cases where a polycarboxylic acid cement dispersant is applied to an ultrarapid hardening cement composition, disclosed is a production method of a highly flowable rapid-hardening cement mix material having high flowability, comprising adding a polycarboxylic acid (salt) to paste, mortar or concrete, each of which has rapid hardening properties (for example, referring to Japanese Kokai Publication No. Hei-07-17749 (pages 1 and 2)). Also, disclosed is a powdery ultra-rapid-hardening cement composition containing an ultra-rapid hardening cement and a powdery polycarboxylic acid cement dispersant, and in Example, a polycarboxylic acid cement dispersant is used (for example, referring to Japanese Kokai Publication No. 2000-34159 (pages 1 and 2)). However, such cement compositions have room for improvement in order to not only have excellent rapid hardenability, high fluidity, low unit quantity of water, initial fluidity, usable time, dispersibility and the like, but also exhibit excellent initial strength under low temperature atmosphere and provide a hardened product with sufficiently excellent strength.

SUMMARY OF THE INVENTION

The present invention has been made in view of the above-mentioned state of the art. The present invention has an object to provide an ultrarapid hardening cement composition with high strength, the composition having: excellent fluidity; excellent usable time; and excellent initial strength under low temperature atmosphere as well as under general temperature atmosphere, and improving strength and durability of a hardening product of the composition.

The present inventors have made various investigations about ultrarapid hardening cement compositions. They have noted that calcium aluminates are useful as a rapid hardening component. They have found that if a cement dispersant containing a polyacrylic acid copolymer (a polyacrylic acid-based copolymer) having a polyethylene oxide chain is used, excellent fluidity can be obtained at a smaller dosage of the dispersant as compared with naphthalene cement dispersants or conventional polycarboxylic acid cement dispersants (mainly containing methacrylic acid-based copolymer), and the fluidity can be retained without increase in the dosage of the retarding agent. They have also found that such a cement dispersant can provide a hardening product of a cement composition having higher strength than conventional cement compositions because of excellent water reducing performance of providing excellent fluidity for the cement composition under low water/cement ratio in which conventional cement dispersants show remarkably low initial fluidity or can not be kneaded. They have also found that such a composition can provide a cement composition having excellent fluidity and workability such as usable time, as well as excellent rapid hardenability under low temperature atmosphere, and a hardened product having excellent strength and durability. The above-mentioned problems can be admirably solved. Further, the present inventors have found that such a composition can be used in repair and urgent construction in a civil engineering and construction field and can be preferably used for high strength cement paste, mortar, or concrete. Thereby, the present invention has been completed.

In the present invention, "a polycarboxylic acid cement dispersant" or "a polycarboxylic acid type cement dispersant" means a composition for using as a cement dispersant comprising a polycarboxylic acid or an analogous compound thereof such as the polymer described in this description, for example a derivative or a polycarboxylic acid salt.

That is, the present invention relates to an ultrarapid cement hardening composition comprising: an ultrarapid hardening cement (A) comprising a calcium aluminate; and a cement dispersant (B), wherein the cement dispersant (B) comprises a copolymer having: a repeating unit derived from a monomer represented by the following formula (1):

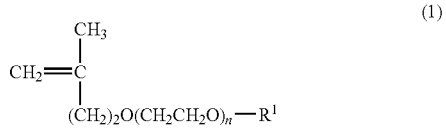

in the formula, $R^1$ being the same or different and each representing a hydrogen atom or an alkyl group containing 1 to 18 carbon atoms; n representing an average molar number of addition and being a number of 10 to 300; and a repeating unit derived from a monomer represented by the following formula (2):

in the formula, M representing a hydrogen atom, a monovalent metal atom, a divalent metal atom, an ammonium group, or an organic amine group.

The present invention is also a cement dispersant used for dispersing an ultrarapid hardening cement comprising a calcium aluminate, wherein the cement dispersant comprises a copolymer having: a repeating unit derived from a monomer represented by the following formula (1):

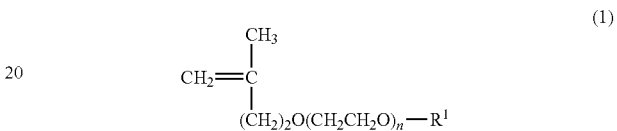

in the formula, $R^1$ being the same or different and each representing a hydrogen atom or an alkyl group containing 1 to 18 carbon atoms; n representing an average molar number of addition and being a number of 10 to 300; and a repeating unit derived from a monomer represented by the following formula (2):

in the formula, M representing a hydrogen atom, a monovalent metal atom, a divalent metal atom, an ammonium group, or an organic amine group.

DETAILED DESCRIPTION OF THE INVENTION

The present invention is described in more detail below.

The present invention is an ultrarapid hardening cement composition comprising: an ultrarapid hardening cement (A) comprising a calcium aluminate as an essential component; and a cement dispersant (B).

The ultrarapid hardening cement composition has a hardening rate faster than that of general cement compositions because the composition has a calcium aluminate as an essential component. As the hardening rate, it is preferable that the composition shows a compressive strength of material age of 3 hours of $20 N/mm^2$ or more, the compressive strength being measured according to JIS R 5201 "Physical testing method of cement." The upper limit of the compressive strength is not especially limited and preferably $60 N/mm^2$ or less.

The above-mentioned ultrarapid hardening cement (A) comprises a calcium aluminate as an essential component. The calcium aluminate is a component of enhancing rapid hardenability in the ultrarapid hardening cement composition.

The above-mentioned calcium aluminate preferably contains at least one main component selected from the group consisting of $C_{11}A_7 \cdot CaX_2$, $C_3A$, $CA$, $C_2AS$, $CA_2$, $C_3A_3 \cdot CaSO_4$, $C_{12}A_7$, $C_6AF_2$, $C_4AF$ (C representing CaO; A representing $Al_2O_3$; S representing $SiO_2$; S in $CaSO_4$ representing a sulfur atom; F representing $Fe_2O_3$; and X representing a halogen element), and amorphous calcium aluminates. Among them, $C_{11}A_7 \cdot CaF_2$, and amorphous calcium aluminates are more preferable, and $C_{11}A_7 \cdot CaF_2$ is still more preferable.

The content of the above-mentioned calcium aluminate is preferably 10 to 30% by weight relative to 100% by weight of the ultrarapid hardening cement (A). If the content is less than 10% by weight, the rapid hardenability may be insufficiently exhibited. If the content is more than 30% by weight, the usable time may be sufficiently secured, leading to insufficiently excellent workability.

The above-mentioned cement dispersant (B) comprises a copolymer (also referred to as "polyacrylic acid copolymer having a polyethylene oxide chain" or "polyacrylic acid copolymer") having a repeating unit derived from a monomer represented by the above formula (1) (also referred to as "repeating unit (I)" or "the constitutional unit (1)"), and a repeating unit derived from a monomer represented by the above formula (2) (also referred to as "repeating unit (II)" or "the constitutional unit (II)"). If such a cement dispersant comprising a polyacrylic acid copolymer having a polyethylene oxide chain is used, excellent fluidity can be obtained at a small dosage of the dispersant, and the fluidity can be retained without increasing an dosage of a retarding agent. The polyacrylic acid copolymer having the above-mentioned structure is excellent in rapid hardenability if used as a cement dispersant, and therefore can be preferably used as an ultrarapid hardening cement composition.

In the above-mentioned ultrarapid hardening cement composition, the ratio (weight ratio or mass ratio) of the cement dispersant (B) to the ultrarapid hardening cement (A) is preferably 0.01:100 to 8.0:100. If the ratio of (B):(A) is less than 0.01:100, the dispersing effect may be insufficient. If the ratio of (B):(A) is more than 8.0:100, the dispersing effect is not improved above a certain level, possibly resulting in economic inefficiency. The ratio of (B):(A) is more preferably 0.2:100 to 0.4:100.

The ratio (weight ratio or mass ratio) of the above-mentioned ultrarapid hardening cement (A) to the ultrarapid hardening cement composition is preferably 10:100 to 80:100. If the ratio of the ultrarapid hardening cement to the ultrarapid hardening cement composition is less than 10:100, the strength and the durability may be insufficient. If the ratio is more than 80:100, uniform kneading may be difficult to perform.

It is preferable that the ultrarapid hardening cement composition further comprises a retarding agent. The ultrarapid hardening cement composition comprising a retarding agent (also referred to as simply "retarder") can exhibit high dispersion retention and the usable time of work in the ultrarapid hardening cement composition can be adjusted.

The above-mentioned retarding agent is not especially limited as long as it can delay hydration of an ultrarapid hardening cement to be used. Such a retarder is preferably an oxycarboxylic acid compound. The above-mentioned oxycarboxylic acid compound means a compound having a hydroxyl group and a carboxyl group or a salt thereof in the molecule. The oxycarboxylic acid compound is preferably an oxycarboxylic acid containing 4 to 10 carbon atoms and a salt thereof. Examples thereof include citric acid, gluconic acid, tartaric acid, a glucoheptonic acid, arabonic acid, malic acid, and inorganic or organic salts thereof such as sodium salts thereof, potassium salts thereof, calcium salts thereof, magnesium salts thereof, ammonium salts thereof, and triethanolamine salts thereof. One or two or more species of them may be preferably used. Among them, gluconic acid or salts thereof is/are preferably used.

The content of the above-mentioned retarding agent (retarding agent/ultrarapid hardening cement (ratio by weight)) is preferably 0.01 to 1.0, relative to 100% by weight of the ultrarapid hardening cement (A). If the content is less than 0.01, the fluidity retention may be insufficient. If the content is more than 1.0, the initial strength exhibiting property may be insufficient. The content is more preferably 0.02 to 0.5 and still more preferably 0.05 to 0.4.

It is preferable that the ultrarapid hardening cement composition further comprises a compound prepared by adding an alkylene oxide to a polyalkylene imine (hereinafter, also referred to as "PAI/PAO adduct"). If the ultrarapid hardening cement composition comprises such a PAI/PAO adduct, aggregation of hydration products produced by rapid hydration of the ultrarapid hardening cement can be prevented, and thereby stiffness phenomenon of the ultrarapid hardening cement composition can be eased.

As the above-mentioned polyalkylene imine, preferred are alkylene imine homopolymers or copolymers prepared by polymerizing, by conventional method, one or two or more species of alkylene imines containing 2 to 8 carbon atoms such as ethyleneimine, propyleneimine, 1,2-butylene imine, 2,3-butylene imine, and 1,1-dimethyl ethyleneimine. A polyethylene imine polymer containing ethylene imine as a main component is more preferred. In these alkylene imine homopolymers or copolymers, a polyalkylene imine chain is formed and such a chain essentially has a branched structure. The polyalkylene imines may be prepared by polymerizing ethylenediamine, diethylenetriamine, triethylenetetramine and the like. Such a polyalkylene imine generally has, in the structure, a primary or secondary amino (imino) group containing an active hydrogen atom, in addition to a tertiary amino group. Such a polyalkylene imine preferably has a weight average molecular weight of 100 to 100000, and more preferably 300 to 50000, and still more preferably 500 to 10000.

Alkylene oxides containing 2 to 8 carbon atoms such as ethyleneoxide, propyleneoxide, and butylene oxide are preferred as the above-mentioned polyalkylene oxide. These may be used singly or in combination of two or more species of them. Among them, an ethylene oxide, a propylene oxide, and a butylene oxide are preferred. More preferably, the polyalkylene oxide contains an ethylene oxide or a propylene oxide, as a main component.

In the above-mentioned alkylene oxide adduct, the average molar number of addition of the oxyalkylene is preferably more than 0 and 300 or less. Also, it is more preferably 1 or more, and still more preferably 3 or more. Further, it is more preferably 200 or less, and still more preferably 150 or less, and particularly preferably 100 or less.

In the above-mentioned ultrarapid hardening cement composition, the ratio (weight ratio or mass ratio) of the PAI/PAO adduct (C) to the cement dispersant (B), (C):(B) is preferably 1:100 to 100:100. If the ratio is less than 1:100, the stiff prevention effect cannot be exhibited. If the ratio is more than 100:100, the stiff prevention effect is not be improved anymore, possibly resulting in economic inefficient. The ratio of (C) to (B) is 5:100 to 30:100.

It is preferable that the ultrarapid hardening cement composition is produced by being kneaded at a water/cement ratio of 35% by mass or less. The water/cement ratio means a ratio by weight of water to the ultrarapid hardening cement (A). If the water/cement ratio is more than 35% by mass (35% by weight, 35 weight %, or 35 mass %), effect of improving strength of the hardening product of the ultrarapid hardening cement composition cannot be expected. The water/cement ratio is more preferably 30% by mass or less, and still more preferably 25% by mass or less. The lower limit thereof is preferably 20% by mass or more.

The above-mentioned ultrarapid hardening cement composition can be kneaded and placed at an ambient temperature of 15° C. or less. If the cement composition is kneaded and placed at an ambient temperature of 15° C. or less, the cement composition can be preferably used without reduction in strength caused in other ultrarapid hardening cement compositions, even in winter when the ultrarapid hardening cement compositions are highly demanded. The ambient temperature at which the composition is kneaded and placed is more preferably 10° C. or less, and still more preferably 5° C. or less. The lower limit thereof is preferably 0° C. or more.

The above-mentioned ultrarapid hardening cement composition can improve the workability while retaining the rapid hardenability, and sufficiently exhibit the functional effects of the present invention at a low water/cement ratio, or under low temperature atmosphere. Therefore, such a composition can be used in repair and urgent construction in a civil engineering and construction field, and preferably used for cement paste, mortar, or concrete. The ultrarapid hardening cement composition of the present invention has sufficiently high strength after hardened, and therefore can be preferably used for high strength cement paste, mortar, or concrete.

The above-mentioned "for high strength cement paste, mortar, or concrete" means an application of construction using a concrete satisfying performances as high strength concrete, or an application of construction using mortar or paste having an composition equal to that of mortar matter or paste matter in such concrete.

The high strength concrete means a concrete having a design strength of more than 36 N/mm$^2$.

The present invention is also a cement dispersant used for dispersing an ultrarapid hardening cement comprising a calcium aluminate, wherein the cement dispersant comprises a copolymer having a repeating unit derived from a monomer represented by the above formula (1) and a repeating unit derived from a monomer represented by the above formula (2).

The copolymer (polyacrylic acid copolymer) comprised in the above-mentioned cement dispersant has a repeating unit (repeating unit (I)) derived from a monomer represented by the above formula (1) and a repeating unit (repeating unit (II)) derived from a monomer represented by the above formula (2).

Such a copolymer can be produced by copolymerization of a monomer component containing the monomer providing the repeating unit (I) and the monomer providing the repeating unit (II) as essential components. Such a monomer component may further contain a monomer providing a constitutional unit (III). In the above-mentioned polyacrylic acid copolymer, the repeating units (I) and (II), and the repeating unit (III) contained if necessary, may be polymerized by any of random copolymerization, block copolymerization, alternative copolymerization, and the like.

In the above formula (1), $R^1$ may be the same or different, and each represent a hydrogen atom, or an alkyl group containing 1 to 18 carbon atoms. The alkyl group containing 1 to 18 carbon atoms may have a straight or branched chain. $R^1$ is preferably a hydrogen atom, a methyl group, or an ethyl group. Among them, the alkyl group is preferably a hydrogen atom. The average molar number of addition of an oxyethylene group is the number of 10 to 300, and preferably 15 to 200, and more preferably 25 to 100.

In the above formula (2), M represents a hydrogen atom, a monovalent metal atom, a divalent metal atom, an ammonium group, or an organic amine group. Alkali metal atoms such as lithium, sodium, and potassium are preferred as the monovalent metal atom. Alkaline earth metal atoms such as calcium and magnesium are preferred as the divalent metal atom. Preferred examples of the organic amine group include: alkanolamine groups such as ethanolamine group, diethanolamine group, and triethanolamine group; triethylamine groups; and organic ammonium groups. Among them, M preferably represents sodium or calcium. That is, the monomer represented by the above formula (2) is preferably a sodium salt, or a calcium salt.

In the above-mentioned polyacrylic acid copolymer, the ratio (ratio by weight) of the repeating unit (I) to the repeating unit (II) to another constitutional unit (III) is preferably 98 to 2:2 to 98:0 to 50. The ratio is more preferably 95 to 50:5 to 50:0 to 50, and still more preferably 95 to 70:5 to 30:0 to 50. The repeating unit (I), the repeating unit (II), and the constitutional unit (III) is totally 100% by weight.

The monomer providing the constitutional unit (I) which can be used in the present invention may be a compound prepared by adding 10 to 300 mol ethylene oxide polymer to 3-methyl-3-butene-1-ol, or a compound prepared by adding 10 to 300 mol ethylene oxide polymer to 3-methyl-2-butene-1-ol and then substituting a hydroxyl group at the terminal with an alkyl group, or a compound prepared by reacting a polyethylene glycol mono alkylether with 3-methyl-2-butene-1-ol. The monomer providing the constitutional unit (II) that can be used in the present invention may be acrylic acid.

The monomer providing the constitutional unit (II) which can be used in the present invention may be a monomer copolymerizable with at least one of the monomers (I) and (II), and may be preferably the following monomers.

Halfesters or diesters of an unsaturated dicarboxylic acid such as maleic acid, fumaric acid, itaconic acid, and citraconic acid, with an alcohol containing 1 to 4 carbon atoms; halfamides or diamides of the above-mentioned unsaturated dicarboxylic acid with an amine containing 1 to 3 carbon atoms; halfesters or diesters of an alkyl (poly)alkylene glycol prepared by adding 1 to 500 mol of an alkylene oxide containing 2 to 18 carbon atoms with the above-mentioned alcohol or amine, with the above-mentioned unsaturated dicarboxylic acid; halfesters or diesters of the above-mentioned unsaturated dicarboxylic acid with a glycol containing 2 to 18 carbon atoms or a polyalkylene glycol with which 2 to 300 mol of such a glycol is added;

halfamides of maleamic acid with a glycol containing 2 to 18 carbon atoms or a polyalkylene glycol with which 2 to 300 mol of such a glycol is added; (poly)alkylene glycol di (meth) acrylates such as triethylene glycol di (meth)acrylate, (poly) ethylene glycol di(meth)acrylate, polypropylene glycol di(meth)acrylate, and (poly)ethylene glycol (poly)propylene glycol di (meth)acrylate; difunctional (meth)acrylates such as hexanediol di(meth)acrylate, trimethylolproprane tri(meth) acrylate, and trimethylolpropane di(meth)acrylate; (poly) alkylene glycol dimaleates such as triethylene glycol dimaleate and polyethylene glycol dimaleate;

unsaturated sulfonic acids such as vinyl sulfonate, (meth) allyl sulfonate, 2-(meth)acryloxy ethyl sulfonate, 3-(meth) acryloxy propyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyloxysulfobenzoate, 4-(meth)acryloxy butylsulfonate, (meth) acrylamide methylsulfonate, (meth)acrylamide ethylsulfonate, 2-methylpropane sulfonate (meth)acrylamide, and styrene sulfonate, monovalenet salts thereof, divalent salts thereof, ammonium salts thereof and organic amine salts thereof; unsaturated monocarboxylic acids such as acrylic acid, methacrylic acid, and crotonic acid, metal salts thereof, ammonium salts thereof, and amine salts thereof;

esters of an unsaturated monocarboxylic acid such as methyl (meth)acrylate, ethyl (meth)acrylate, propyl (meth)acrylate, glycidyl (meth)acrylate, methyl crotonate, ethyl crotonate, and propyl crotonate with an alcohol containing 1 to 4 carbon atoms; amides such as methyl (meth)acrylamide, of an unsaturated monocarboxylic acid with an amine containing 1 to 30 carbon atoms; vinyl aromatic groups such as styrene, α-methyl styrene, vinyltoluene, and p-methyl styrene; alkanediol mono (meth)acrylates such as 1,4-butanediol mono (meth)acrylate, 1,5-pentanediol mono(meth)acrylate, and 1,6-hexanediol mono(meth)acrylate; dienes such as butadiene, isoprene, 2-methyl-1,3-butadiene, and 2-chlor-1, 3-butadiene; unsaturated amides such as (meth)acrylamide, (meth)acrylalkylamide, N-methylol (meth)acrylamide, N,N-dimethyl (meth)acrylamide; unsaturated cyanide compounds such as (meth)acrylonitrile and α-chloroacrylonitrile;

unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; divinyl aromatic groups such as divinyl benzene; cyanurates such as triallyl cyanurate; allyl groups such as (meth)allyl alcohol, glycidyl (meth)allyl ether; unsaturated amino compounds such as dimethylaminoethyl (meth)acrylate; vinyl ethers or allyl ethers such as methoxy polyethylene glycol monovinyl ether, polyethylene glycol monovinyl ether, methoxy polyethylene glycol mono(meth)allyl ether, and polyethylene glycol mono(meth)allyl ether;

siloxane derivatives such as polydimethylsiloxane propylamino maleinamic acid, polydimethylsiloxane aminopropyleneamino maleinamic acid, polydimethylsiloxane-bis-(propylamino maleinamic acid), polydimethylsiloxane-bis-(dipropyleneamino maleinamic acid), polydimethylsiloxane-(1-propyl-3-acrylate), polydimethylsiloxane-(1-propyl-3-methacrylate), polydimethylsiloxane-bis-(1-propyl-3-acrylate), and polydimethylsiloxane-bis-(1-propyl-3-methacrylate); unsaturated phosphoric esters such as 2-acryloyloxyethyl phosphate, and 2-methacryloyloxyethyl phosphate;

compounds derived, by addition of a specific amount of an alkylene oxide(s), from polyamidepolyamines prepared from condensation products, prepared in turn from polyalkylenepolyamines such as diethylenetriamine, triethylenetetramine, tetraethylenepentamine, pentaethylenehexamine, dipropylenetriamine, tripropylenetetramine and tetrapropylenepentamine and dibasic acids such as malonic acid, succinic acid, fumaric acid, maleic acid, azelaic acid or sebacic acid or esterification products obtained from such dibasic acids and alcohols containing 1 to 20 carbon atom(s) or condensation products from such dibasic acids and alcohols containing 1 to 20 carbon atom(s), by subjecting to further condensation, in specific proportions, with (meth)acrylic acid or an esterification product from (meth)acrylic acid and an alcohol containing 1 to 20 carbon atom(s), or glycidyl (meth)acrylate, allyl glycidyl ether or a like unsaturated epoxy compound; nitrogen-comprising cationic monomers, for example condensation products derived from compounds resulting from addition of an alkylene oxide(s), such as ethylene oxide and propylene oxide, to an active hydrogen atom of a polyalkylene imine, such as polyethyleneimine or polypropyleneimine, and (meth) acrylic acid or an esterification product from (meth) acrylic acid and an alcohol containing 1 to 20 carbon atom(s) or an unsaturated epoxy compound such as glycidyl (meth)acrylate or allyl glycidyl ether.

The above-mentioned polyacrylic acid copolymer is produced by polymerizing the above-mentioned monomer component using a polymerization initiator. The polymerization may be performed by solvent polymerization, bulk polymerization, and the like. The solvent polymerization can be performed in batch system or continuous system. Examples of the solvent used in such a solvent polymerization include water; lower alcohols such as methyl alcohol, ethyl alcohol, and 2-propanol; aromatic or aliphatic hydrocarbons such as benzene, toluene, xylene, cyclohexane, and n-hexane; ester compounds such as ethyl acetate; and ketone compounds such as acetone, and methyl ethyl ketone. One or two or more species of them may be preferably used. It is preferable that at least one species selected from the group consisting of water and lower alcohols containing 1 to 4 carbon atoms in terms of solubility of the monomer as a raw material and the obtained polyacrylic acid copolymer, and convenience in use of the polyacrylic acid copolymer. In such a case, methyl alcohol, ethyl alcohol, and 2-propanol are particularly effective among lower alcohols containing 1 to 4 carbon atoms.

If the polymerization is performed in an aqueous medium to obtain the above-mentioned polyacrylic acid copolymer, aqueous polymerization initiator such as a persulfate or a hydrogen peroxide of ammonium or an alkali metal is preferably used as a polymerization initiator. An accelerator such as sodium hydrogensulfite, Mohr's salt, ascorbic acid (salt), and rongalite may be used in combination. If a lower alcohol, an aromatic hydrocarbon, an aliphatic hydrocarbon, an ester compound, or a ketone compound is used as a solvent in the polymerization, the following compounds may be preferably used as a polymerization initiator: peroxides such as benzoyl peroxide and lauroyl peroxide; hydroperoxides such as cumene hydroperoxide; and azo compounds such as azobisisobutyronitrile. An accelerator such as amine compounds may be used in combination. Further, if a mixed solvent of water and a lower alcohol is used, the mixed solvent is appropriately selected from the above-mentioned various polymerization initiators or the combination of the polymerization initiators and the accelerators and then used.

The polymerization temperature is appropriately determined depending on the solvent to be used or the polymerizaiton initiator to be used, and generally 0 to 120° C., and preferably 30° C. or more. The polymerization temperature is more preferably 50° C. or more. Also, the polymerization temperature is preferably 100° C. or less and more preferably 95° C. or less.

The bulk polymerization is performed at 50 to 200° C., generally using, as a polymerization initiator, a peroxide such as benzoyl peroxide and lauroyl peroxide; a hydroperoxide such as cumene hydroperoxide; or an azo compound such as azobisisobutyronitrile.

A hypophosphorous acid (salt) or a thiol chain transfer agent may be also used in combination for adjusting the molecular weight of the polyacrylic acid copolymer to be obtained. The thiol chain transfer agent used in this case, is represented by the formula HS—$R^{30}$-Eg (in the formula, $R^{30}$ representing an alkyl group containing 1 or 2 carbon atoms; E representing —OH, —COOM, —$COOR^{31}$ or $SO_3M$; M representing a hydrogen atom, a monovalent metal atom, a divalent metal atom, an ammonium group, or an organic amine group; $R^{31}$ representing an alkyl group containing 1 to 30 carbon atoms; g representing an integer of 1 or 2. Preferred examples of such a thiol chain transfer agent include mercaptoethanol, thioglycerol, thioglycolic acid, 2-mercaptopropionic acid, 3-mercaptopropionic acid, thiomalic acid, octyl thioglycolate and 3-mercaptooctyl propionate. A thiol compound having a hydrocarbon group containing 3 or more carbon atoms with no functional group, such as a hydroxyl group and a carboxyl group, may be used as the chain transfer agent. Preferred examples of such a thiol compound include butane thiol, octane thiol, decane thiol, dodecane thiol, hexadecane thiol, cyclohexyl mercaptan, and thiophenol. A halide such as carbon tetrachloride, carbon tetrabromide, methylene chloride, bromo form, and bromotrichloroethane; or an unsaturated hydrocarbon compound such as α-methyl styrene dimer, α-terpinene, γ-terpinene, and dipentene may be used as the chain transfer agent. One or two or more species of them may be used. It is effective for adjusting the molecular weight of the polyacrylic acid copolymer that a monomer having high chain transfer property such as (meth) acrylic sulfonic acid (salt) is used as a monomer (e).

The above-mentioned polyacrylic acid copolymer may be used as it is. If the copolymer is insufficient in solubility in water, the copolymer is preferably used as a polymer salt prepared by being neutralized with inorganic substances such as hydroxides, chlorides, and carbon salts of monovalent metals or divalent metals; ammonia; alkaline substances such as organic amines (preferably, hydroxides of monovalent metals such as sodium hydroxide and potassium hydroxide) in order to be handled as an aqueous medium containing no organic solvent by improving the solubility in water.

The weight average molecular weight of the above-mentioned polyacrylic acid copolymer is preferably 5000 to 1000000 on polyethylene glycol equivalent basis, measured by gel permeation chromatography (hereinafter, referred to as "GPC"), and preferably 500000 or less. The weight average molecular weight is more preferably 10000 or more and 300000 or less. If the weight average molecular weight is less than 5000, the performance of reducing segregation may be reduced. If the weight average molecular weight is more than 1000000, the dispersibility may be reduced.

(Measurement Condition of Weight Average Molecular Weight)
Model: Waters LCM1
Detecting element: Waters 410 differential refraction detecting element
Analysis software: Waters MILLENNIUM Ver. 2.18
Eluent: prepared by dissolving sodium acetate trihydrate 115.6 g into a mixed liquid of water 10999 g and acetonitrile 6001 g, and by adjusting the mixture to pH 6.0 with a 30% aqueous solution of sodium hydroxide.
Eluent flow rate: 0.8 ml/min
Column temperature: 35° C.
Column: product of TOSOH Corp. TSKgel GuardColumn-SWXL+G4000 SWXL+G3000 SWXL+G2000SWXL
Standard substance: Polyethylene glycol, weight average molecular weight (Mw) 272500, 219300, 85000, 46000, 24000, 12600, 4250, 7100, 1470

The mixed ratio of the above-mentioned cement dispersant in the ultrarapid hardening cement composition of the present invention (the cement dispersant/the ultrarapid hardening cement composition) is preferably 0.01% by weight or more, and 5.0% by weight or less, relative to 100% by weight of the ultrarapid hardening cement composition. If the mixed ratio is less than 0.01% by weight, the composition may be insufficient in performances. If more than 5.0% by weight of the dispersant is added, the effects are not improved any more, possibly resulting in disadvantage in terms of economic efficiency. The mixed ratio is more preferably 0.02% by weight or more, and still more preferably 0.05% by weight or more. Also, the mixed ratio is more preferably 2.0% by weight or less, and still more preferably 1.0% by weight or less. The cement dispersant may be added so as to satisfy such a ratio. This addition of the cement dispersant brings various preferable effects such as reduction in unit quantity of water, increase in strength, and improvement in durability.

The ultrarapid hardening cement (A) in the ultrarapid hardening cement composition of the present invention will be described. The ultrarapid hardening cement of the present invention contains: a clinker mineral containing a calcium aluminate; and a sulfate. The clinker mineral includes $C_3S$ and $C_2S$ in addition to the above-mentioned calcium aluminates. Preferred examples of the sulfate include alkali metal sulfates such as mirabilite (sodium sulfate) and potassium sulfate; alkali earth metal sulfates such as magnesium sulfate and gypsum (calcium sulfate); and aluminum sulfate. Gypsum or combination use of gypsum and mirabilite is preferable in view of strength exhibiting property. Examples of the gypsum include anhydrous gypsum, hemihydrate gypsum, gypsum dihydrate, and mixtures thereof. Calcium hydroxide may be mentioned as another material that can be mixed, if necessary. The calcium hydroxide is added for enforcing the strength. In the ultrarapid hardening cement, the ratio of the clinker mineral is 70 to 90% by weight; the ratio of the sulfate is preferably 10 to 30% by weight; and the ratio of the calcium hydroxide that is added if necessary is preferably 0 to 1% by weight. The ultrarapid hardening cement (A) may be an ultrarapid hardening cement prepared by mixing the rapid hardening component of the present invention with a cement such as the following portland cement.

Fine particles such as blast furnace slag, fly ash, cinder ash, clinker ash, husk ash, silica fume, silica powder, and limestone powder, or gypsum may be added as the cement component of the ultrarapid hardening cement composition. One or two or more species of the following cements may be added in addition to the ultrarapid hardening cement. Portland cement (ordinary, high early strength, ultrahigh early strength, moderate heat, sulfate resistance, and low alkaline type thereof); various mixed cements (portland blast furnace cement, pozzolanic cement, fly ash cement); white portland cement; alumina cement; grouting cement; oil well cement; low heat cement (low heat Portland blast furnace cement, fly ash-mixed low heat Portland blast furnace cement, belite-highly containing cement); ultrahigh strength cement; cement solidification material; and ecocement (cement manufactured by using one or more kind of municipal refuse incinerated ash and sludge incinerated ash as a raw material)

The ultrarapid hardening cement composition of the present invention comprises the ultrarapid hardening cement (A), the cement dispersant (B), and water as essential components, and may further comprise the retarding agent. The ultrarapid hardening cement composition may contain an aggregate such as fine aggregate and coarse aggregate, and other components.

Sand is preferred as the above-mentioned fine aggregate. Examples of the coarse aggregate that may be used include river gravel, crushed stone, granulated slag, recycled aggregates, and refractory aggregates such as silicas and, argillaceous, zircon, high alumina, silicon carbide, graphite, chromium, chromag, and magnesia. These may be singly or in combination of two or more species of them.

In the ultrarapid hardening cement composition of the present invention, it is preferable that the unit quantity of water per $m^3$ of the ultrarapid hardening cement composition (water/ultrarapid hardening cement composition), the use amount of the cement (the ultrarapid hardening cement and other cement components if necessary), the amount of the coarse aggregate, and the retarding agent/the ultrarapid hardening cement composition show the following values, respectively. The unit quantity of water is 100 to 185 $kg/m^3$; the use amount of the cement is 250 to 800 $kg/m^3$; the unit amount of the coarse aggregate is 500 to 1500 kg/m$^3$; the water/the ultrarapid hardening cement composition ratio (ratio by weight) is 0.1 to 0.7, and the retarding agent/the ultrarapid hardening cement composition ratio (ratio by weight) is $5\times10^{-6}$ to $5\times10^{-3}$. The unit quantity of water is more preferably 120 kg/m$^3$ or more and 175 kg/m$^3$ or less. The use amount of the ultrarapid hardening cement is more preferably 270 kg/m$^3$ or more and 800 kg/m$^3$ or less. The unit amount of the coarse aggregate is more preferably 600 kg/m$^3$ or more and 1300 kg/m$^3$ or less, and still more preferably 800 kg/m$^3$ or more and 1200 kg/m$^3$ or less. The water/the ultrarapid hardening cement composition ratio (ratio by weight) is more preferably 0.15 or more, and still more preferably 0.2 or more. The ratio is more preferably 0.65 or less and still more preferably 0.5 or less. The retarding agent/the ultrarapid hardening cement composition ratio (ratio by weight) is more preferably $5\times10^{-5}$ to $2\times10^{-3}$, and still more preferably $1\times10^{-4}$ to $1.2\times10^{-3}$. The ultrarapid hardening cement composition of the present invention can be widely used at lean-mix design to rich-mix design. The composition is effective in high strength concrete having a high unit amount of cement, and lean-mix concrete having a unit quantity of cement of 300 kg/m$^3$ or less.

Into the ultrarapid hardening cement composition of the present invention may be added the following components, in addition to the above-mentioned components, unless the functional effects of the present invention are sacrificed. Cement dispersants other than the polyacrylic acid cement dispersant (polyacrylic acid type cement dispersant); concrete admixtures such as AE agent, defoaming agent, cement wetting agent, inflating agent, waterproofing agent, accelerating agent, thickener, flocculent, drying shrinkage reduction agent, hardness improver, hardening accelerator, contraction reduction agent, separation reducing agent, carbonation inhibitor, and antirust; and other water-soluble polymer compounds.

Specific examples of the above-mentioned cement dispersants other than the polyacrylic acid dispersant include various sulfonic acid cement dispersants (sulfonic acid type cement dispersants) such as: polyalkylaryl sulfonates such as naphthalenesulfonic acid formaldehyde condensate, methylnaphthalenesulfonic acid formaldehyde condensate, and anthracenesulfonic acid formaldehyde condensate; melamine-formaldehyde resin sulfonates such as melamine sulfonate formaldehyde condensate; aromatic amino sulfonates such as aminoaryl sulfonic acid-phenol-formaldehyde condensate; lignin sulfonates such as lignin sulfonate and modified lignin sulfonate; and polystyrene sulfonates.

In the present invention, it is preferable that good-quality air is introduced into the ultrarapid hardening cement composition, and the composition further contains an AE agent for improvement in freezing and thawing resistance. In this case, the above-mentioned ultrarapid hardening cement composition can stably retain the amount of entrained air and a hardened product of the composition can be excellent in freezing and thawing resistance, strength, and durability, even if the composition is used for a longer kneading time during the production, that is, even if the composition is kept kneading for a long time during the transportation.

The following agents may be used in combination in the ultrarapid hardening cement composition. Various AE agents such as alkyl ether anionic surfactant, modified resin acid compound anionic surfactant, alkyl sulfonic acid compound anionic surfactant, high alkyl carboxylate anionic surfactant, and modified alkyl carboxylic acid compound anionic surfactant; Vinsol (tradename, YAMASO CHEMICAL CO., LTD.); or Micro-Air (tradename, Master Builder Inc.).

Specific examples of the above-mentioned AE agent include sodium hydroxy stearate, lauryl sulfate, ABS (alkylbenzene sulfonic acid) and LAS (straight chain alkylbenzene sulfonic acid), alkane sulfonate, polyoxyethylene alkyl(phenyl)ether, polyoxyethylene alkyl(phenyl)ether sulfate or salts thereof, polyoxyethylenealkyl (phenyl)ether phosphate or salts thereof, protein materials, alkenyl sulfosuccinate, and α-olefin sulfonate.

Specific examples of the above-mentioned defoaming agent include polyoxyalkylenes such as (poly)oxyethylene (poly)oxypropylene adduct; polyoxyalkylene alkyl ethers such as diethylene glycol heptyl ether, polyoxyethylene oleyl ether, polyoxypropylene butyl ether, polyoxyethylene polyoxypropylene 2-ethyl hexyl ether, and oxyethylene oxypropylene adducts to a higher alcohol containing 12 to 14 carbon atoms; polyoxyalkylene (alkyl)aryl ethers such as polyoxypropylene phenyl ether and polyoxyethylene nonylphenyl ether; acetylene ethers prepared by adding an alkylene oxide to an acetylene alcohol, such as 2,4,7,9-tetramethyl-5-desine-4,7-diol, 2,5-dimethyl-3-hexine-2,5-diol, and 3-methyl-1-butene-3-ol by polymerization; (poly)oxyalkylene fatty acid esters such as diethylene glycol oleate, diethylene glycol laurylic acid ester and ethylene glycol distearate; polyoxyalkylene sorbitan fatty acid esters such as polyoxyethylene sorbitan monolauric acid ester, and polyoxyethylene sorbitan triolein acid ester; polyoxyalkylene alkyl(aryl)ether sulfates such as polyoxypropylene methyl ether sodium sulfate, and polyoxyethylene dodecyl phenyl ether sodium sulfate; polyoxyalkylene alkyl phosphates such as polyoxyethylene stearyl phosphate; and polyoxyalkylene alkylamines such as polyoxypropylene polyoxyethylene laurylamine (1 to 20 mol propylene oxides is added, 1 to 20 mol ethylene oxide is added) and hardened tallow amines to which an alkylene oxide is added (1 to 20 mol propylene oxide is added, 1 to 20 mol ethylene oxide adduct is added); and polyoxyalkylene amides. One or two or more species of these defoaming agents may be used. Such an defoaming agent may be added before the polymerization, during the polymerization, or after the polymerization. The addition ratio of the defoaming agent is preferably 0.0001 to 10% by weight, relative to a total amount of the polymer for the ultrarapid hardening cement composition.

Specific examples of defoaming agent s other than the above-mentioned oxyalkylene defoaming agents include mineral oil defoaming agents such as kerosene and liquid paraffin; fats and oil defoaming agents such as animal and vegetable oils, sesame oil, castor oil, and alkylene oxide adducts thereof; fatty acid defoaming agents such as oleic acid, stearic acid, and alkylene oxide adducts thereof; fatty acid ester defoaming agents such as glycerol monoricinoleate, alkenyl succinic acid derivatives, sorbitol monolaurate, sorbitol trioleate, and natural wax; alcohol defoaming agents such as octyl alcohols, hexadecyl alcohols, acetylene alcohols, and glycols; amide defoaming agents such as acrylate polyamines; phosphate defoaming agents such as tributyl phosphate, and sodium octyl phosphate; metal soap defoaming agents such as aluminum stearate and calcium oleate; and silicone defoaming agents such as dimethyl silicone oil, silicone paste, silicone emulsion, organic modified polysiloxanes (polyorganosiloxanes, such as dimethylpolysiloxane), and fluoro silicone oil.

Specific examples of the above-mentioned hardening accelerator include soluble calcium salts such as calcium chloride, calcium nitrite, calcium nitrate, calcium bromide, and calcium iodide; chlorides such as iron chloride and magnesium chloride; sulfates; potassium hydroxides; sodium hydroxides; carbonates; thiosulfates; formates such as formic acid and calcium formate; alkanolamines; alumina cements; and calcium aluminate silicate.

Specific examples of the above-mentioned water-soluble polymer compounds include nonionic cellulose ethers such as methylcellulose, ethyl cellulose, hydroxymethyl cellulose, hydroxyethyl cellulose, carboxymethylcellulose, carboxyethylcellulose, and hydroxypropylcellulose; polysaccharide derivatives prepared by substituting a hydrogen atom of part or all of hydroxyl groups of an alkyl or hydroxyalkyl derivative of a polysaccharide such as methylcellulose, ethyl cellulose, hydroxyethyl cellulose, and hydroxypropyl cellulose, with a hydrophobic substituent group having a hydrocarbon chain containing 8 to 40 carbon atoms as a partial structure, and an ionic hydrophilic substituent group having a sulfonic acid group or a salt thereof as a partial structure; polysaccharides produced by microbial fermentation such as yeast glucan, xanthane gum, and β-1,3 glucans (having a straight or branched chain, examples thereof include curdlan, paramylum, pachyman, scleroglucan, and laminaran); polyacrylamides; polyvinyl alcohols; starch; starch phosphate; sodium arginine; gelatin; and acrylic acid copolymers having an amino group in the molecule and qualified compounds thereof.

The present invention is also a production method of the ultrarapid hardening cement composition, wherein the production method comprises a step of kneading the ultrarapid hardening cement composition at a water/cement ratio of 35% by mass or less. The present invention is also a production method of the ultrarapid hardening cement composition, wherein the production method comprises a step of kneading and placing the ultrarapid hardening cement composition at an ambient temperature of 15° C. or less. In the present invention, the ultrarapid hardening cement composition after hardened has sufficient strength through the kneading step at a low water/cement ratio, that is, at a water/cement ratio of 35% by mass or less. Also, the ultrarapid hardening cement composition can secure excellent rapid hardenability and sufficient usable time even in winter when the ultrarapid hardening cement composition is highly demanded, through the kneading and placing step at an ambient temperature of 15° C., that is, by being kneaded or placed under low temperature atmosphere. The production method of the present invention comprises the above-mentioned (1) and/or (2). The addition method or the order of addition of each production raw material is not especially limited.

The above-mentioned ultrarapid hardening cement composition can be preferably produced by the production method comprising the above-mentioned (1) and/or (2). Preferred embodiment and the like in the production method of the present invention is the same as in the ultrarapid hardening cement composition of the present invention.

The ultrarapid hardening cement composition and the dispersant for ultrarapid hardening cement compositions of the present invention have the above-mentioned configurations. The composition and the dispersant have excellent usable time and initial strength exhibiting property as well as excellent fluidity under low temperature atmosphere as well as usual temperature atmosphere, and also they can improve the workability while retaining the rapid hardenability, and can enhance strength and durability of the hardened product.

BEST MODE FOR CARRYING OUT THE INVENTION

The present invention is described in more detail below with reference to Examples, but the present invention is not limited to only these Examples. The terms, "part (s)" and "%" represent "part (s) by weight" and "% by weight", respectively, unless otherwise specified.

Materials and performance evaluation methods used in Examples are shown below.

"Used Materials"

(1) Ultrarapid Hardening Cement
Jet cement (product of Sumitomo Osaka Cement CO., LTD)
(2) Cement Dispersant
Polyacrylic acid cement dispersant (dispersant containing a polyacrylic acid copolymer having a polyethylene oxide chain, and hereinafter, and also in Tables 1 to 3, referred to as "polyacrylic acid dispersant")
Naphthalene dispersant: formaldehyde condensate of naphthalene sulfonate (mighty150; product of Kao Corporation)
Polymethacrylic acid dispersant: polymethacrylic acid-based copolymer which was produced according to the method described in the comparative production Example 3 of Japanese Kokai Publication No. 2001-192250.
Production Method of Polyacrylic Acid Dispersant 1
Into a glass reactor equipped with a thermometer, a stirrer, a dropping funnel, a nitrogen inlet tube and a reflux condenser were charged with water 76.91 g, an unsaturated polyalkylene glycol ether prepared by adding average 50 mol ethylene oxide to 3-methyl-3-butene-1-ol 149.28 g. Then, the reactor inside was substituted with nitrogen under stirring and the contents were heated to 60° C. under a nitrogen atmosphere. The inside temperature was stabilized at 60° C., and then a hydrogen peroxide aqueous solution containing hydrogen peroxide 0.23 g and water 11.01 g was added. Then, acrylic acid 20.17 g and an aqueous solution prepared by dissolving L-ascorbic acid 0.3 g, 3-mercaptopropionic acid 0.79 g in water 40.74 g were added dropwise over 3 hours and 3.5 hours, respectively. Then, the temperature was maintained at 60° C. for one more hour to drive the polymerization reaction to complete. After completion of the polymerization, the solution was neutralized with sodium hydroxide and diluted with water so as to have a concentration of the polymerization component of 40% by weight. The obtained polyacrylic acid copolymer (1) was measured for weight average molecular weight under the following conditions. The copolymer (1) had a weight average molecular weight of 37000.
Production Method of Polyacrylic Acid Dispersant 2
Into a glass reactor equipped with a thermometer, a stirrer, a dropping funnel, a nitrogen inlet tube and a reflux condenser were charged with water 76.91 g, an unsaturated polyalkylene glycol ether prepared by adding average 50 mol ethylene oxide to 3-methyl-3-butene-1-ol 149.28 g. Then, the reactor inside was substituted with nitrogen under stirring and the contents were heated to 60° C. under a nitrogen atmosphere. The inside temperature was stabilized at 60° C., and then a hydrogen peroxide aqueous solution containing hydrogen peroxide 0.23 g and water 11.01 g was added. Then, acrylic acid 14.49 g and an aqueous solution prepared by dissolving L-ascorbic acid 0.3 g, 3-mercaptopropionic acid 0.79 g in water 40.74 g were added dropwise over 3 hours and 3.5 hours, respectively. Then, the temperature was maintained at 60° C. for one more hour to drive the polymerization reaction to complete. After completion of the polymerization, the solution was neutralized with sodium hydroxide and diluted with water so as to have a concentration of the polymerization component of 40% by weight. The obtained polyacrylic acid copolymer (2) was measured for weight average molecular weight under the following conditions. The copolymer (2) had a weight average molecular weight of 37000.

Measurement condition of weight average molecular weight
Model: Waters LCM1
Detecting element: Waters 410 differential refraction detecting element
Analysis software: Waters MILLENNIUM Ver. 2.18
Eluent: prepared by melting sodium acetate trihydrate 115.6 g into a mixed liquid of water 10999 g and acetonitrile 6001 g, and by adjusting the mixture to pH 6.0 with 30% aqueous sodium hydroxide.
Eluent flow rate: 0.8 ml/min
Column temperature: 35° C.
Column: product of TOSOH Corp. TSKgel GuardColumn-SWXL+G4000 SWXL+G3000 SWXL+G2000SWXL
Standard substance: polyethylene glycol, weight average molecular weight (Mw) 272500, 219300, 85000, 46000, 24000, 12600, 4250, 7100, 1470
(3) Additive
Polyalkylene imine-alkylene oxide adduct (PAI/PAO adduct)
Production method of polyalkylene imine-alkylene oxide adduct (PAI/PAO Adduct)

Into a pressurized container equipped with a stirrer, a mamometer, a thermometer were charged a commercially available polyethylene imine (weight average molecular weight 600: molar number of addition of ethylene imine is 14) 40 g and sodium hydride 0.1 g, and the mixture was heated to 130° C. The inner temperature is stabilized at 130° C., and propylene oxide 324.8 g (molar number of addition is 6) was added to the mixture over 3 hours. The mixture was matured for 5 hours at 130° C., and thereinto, ethylene oxide 3285.3 g (molar number of addition is 80) was added over 12 hours. Then, the mixture was matured for 2 hours at 130° C. and the temperature was lowered. Thereby, a polyethylene imine-alkylene oxide adduct (PAI/PAO) was obtained.
(4) Retarding Agent
Jet setter (retarding agent for jet cement, product of Sumitomo Osaka Cement Co., LTD.)
(4) Sand
Class 6 silica sand (product of Sankyu Kaiun Co., Ltd.)
"Performance Evaluation Test"
The cement compositions were subjected to performance evaluation test as follows.

The cement compositions were mixed at mixed ratios shown in Tables 1 to 3, respectively, with Hobart mixer at a normal temperature (20° C.) for 3 minutes. The obtained mortars were measured for flow value as evaluation of the fluidity. The above-mentioned mortars were kept standing for predetermined times and measured for flow value. Thereby, the mortars were evaluated for flow value over time as evaluation of the usable time. The above-mentioned mortar was measured for compressive strength of material age of 3 hours as evaluation of the initial strength exhibiting property. The flow value and the compressive strength were measured according to JIS R 5201 "Physical testing method of cement."

Examples 1 to 3 and Comparative Examples 1 to 7

"Mixing of Ultrarapid Hardening Cement Composition"

An ultrarapid hardening mortar was prepared by kneading Jet cement 1000 g and class 6 silica sand 1200 g with kneading water 380 g into which a dispersant was added.

Table 1 shows the kind and the dosage of the cement dispersant, the dosage of the retarding agent, and the measurement results in Examples and Comparative Examples. In Tables 1 to 3, the dosage (C×%) in the dispersant and the retarding agent represents % by weight to the cement.

TABLE 1

| | Dispersant | | Retarding agent | Mortar flow (mm) | | | Compressive strength |
|---|---|---|---|---|---|---|---|
| | Kind | Dosage (C × %) | Dosage (C × %) | 0 minute | 10 minutes | 20 minutes | (N/mm$^2$) |
| Example 1 | Polyacrylic acid dispersant 1 | 0.6 | 0.2 | 222 | 215 | 180 | 27.5 |
| Example 2 | Polyacrylic acid dispersant 1 | 0.7 | 0.2 | 231 | 225 | 200 | 27.2 |
| Example 3 | Polyacrylic acid dispersant 1 | 0.8 | 0.2 | 249 | 240 | 210 | 26.8 |
| Comparative Example 1 | Naphthalene dispersant | 1.5 | 0.2 | 210 | 155 | Measurement impossible | 27.6 |
| Comparative Example 2 | Naphthalene dispersant | 2 | 0.2 | 223 | 165 | Measurement impossible | Not measured |
| Comparative Example 3 | Naphthalene dispersant | 2.5 | 0.2 | 222 | 180 | Measurement impossible | Not measured |
| Comparative Example 4 | Naphthalene dispersant | 2 | 0.4 | 225 | 190 | 150 | 18.3 |
| Comparative Example 5 | Naphthalene dispersant | 2 | 0.6 | 227 | 200 | 170 | 12.6 |
| Comparative Example 6 | Polymethacrylic acid dispersant | 2 | 0.2 | 207 | 160 | Measurement impossible | Not measured |
| Comparative Example 7 | Polymethacrylic acid dispersant | 2.5 | 0.2 | 220 | 190 | 145 | Not measured |

[Explanation of Performance Evaluation Test Results]
(1) Fluidity
The ultrarapid hardening cement compositions of the present invention can secure fluidity equivalent to that of cement compositions containing conventional dispersants mainly containing a formaldehyde condensate of naphthalene sulfonate (naphthalene dispersant), even at a small dosage of the dispersant. In the cement compositions into which the naphthalene dispersant was added, the flow value did not increase above a certain value even if the dosage of the dispersant was increased. However, the cement compositions of the present invention could show flow values which the cement composition containing the naphthalene dispersant could not show, by adjusting the dosage of the dispersant.

Polymethacrylic acid admixtures (polymethacrylic acid dispersants) generally have cement dispersibility higher than that of naphthalene dispersants. However, in Comparative Examples 6 and 7, more amount of polymethacrylic acid dispersant than the naphthalene dispersant needed to be added in order to show a flow value equivalent to that of the cement composition of the present invention. This result clearly shows that not every polycarboxylic acid dispersant is effective to the ultrarapid hardening cement composition, and that, in some cases, only the dispersant having a compounding disclosed in the present invention can exhibit sufficient effects.

(2) Fluidity Retention

With respect to the fluidity retention of the ultrarapid hardening cement compositions of the present invention, the flow value was hardly changed over time and the workability was good over a prolonged period as compared with the naphthalene dispersant-containing cement composition containing the same amount of the retarding agent and showing the same initial fluidity (the mortar flow value at 0 minute) as those in the ultrarapid hardening cement composition of the present invention. The amount of the retarding agent needed to be increased in order that the composition containing the naphthalene dispersant showed a fluidity retention equivalent to that of the cement composition of the present invention.

(3) Initial Strength Exhibiting Property

The ultrarapid hardening cement composition of the present invention and the cement composition containing the naphthalene dispersant showed almost the same compressive strength of material age of 3 hours, under the condition that the compositions contained the same amount of the retarding agent and showed the same initial fluidity. Under such a condition, the ultrarapid cement composition of the present invention was more excellent in fluidity retention than the cement composition containing the naphthalene dispersant, as mentioned above. If the amount of the retarding agent was increased and thereby the fluidity retention in the composition containing the naphthalene dispersant was improved, the compressive strength of material age of 3 hours was remarkably reduced by the increase of the retarding agent amount. Such a result showed that it was difficult to satisfy both of the fluidity retention and the initial exhibiting property. In contrast, in the case of the ultrarapid hardening cement composition of the present invention, even in the cases where the composition of the present invention contained increased amount of the dispersant as in Example 3, and thus was provided with the high fluidity which the composition containing the naphthalene dispersant could not achieve, such an ultrarapid hardening cement composition showed almost the same compressive strength of material age of 3 hours as in the composition in Example 1 and the initial strength exhibiting properties were not affected.

Examples 4 to 6 and Comparative Examples 8 to 1

"Mixing of Ultrarapid Hardening Cement Composition"

An ultrarapid hardening mortar was prepared in the same manner as in Example 1 except that kneading water was used at a ratio shown in Table 2 and only initial value of the mortar flow value was measured.

Table 2 shows the water/cement ratio, the kind and the dosage of the dispersant, the dosage of the retarding agent, and the measurement results in the ultrarapid hardening cement compositions of the present invention and Comparative Examples.

TABLE 2

|  | Dispersant | Water/cement ratio (%) | Dosage of dispersant (C × %) | Dosage of retarding agent (C × %) | Flow (mm) | Compressive strength (N/mm$^2$) |
| --- | --- | --- | --- | --- | --- | --- |
| Example 4 | Polyacrylic acid dispersant 1 | 34 | 0.7 | 0.2 | 225 | 32.2 |
| Example 5 | Polyacrylic acid dispersant 1 | 30 | 0.9 | 0.2 | 215 | 36.8 |
| Example 6 | Polyacrylic acid dispersant 1 | 38 | 0.6 | 0.2 | 220 | 27.1 |
| Comparative Example 8 | Naphthalene dispersant | 38 | 2 | 0.2 | 220 | 27.2 |
| Comparative Example 9 | Naphthalene dispersant | 34 | 2 | 0.2 | Kneading impossible | — |
| Comparative Example 10 | Naphthalene dispersant | 34 | 2.5 | 0.2 | Kneading impossible | — |
| Comparative Example 11 | Naphthalene dispersant | 34 | 3 | 0.2 | Kneading impossible | — |

"Explanation of Performance Evaluation Test Results"

(1) Fluidity

At the water/cement ratio of 34%, the ultrarapid hardening cement composition of the present invention could be kneaded well and showed excellent fluidity. However, the cement compositions containing the naphthalene dispersant could not be kneaded.

At the water/cement ratio of 38%, the ultrarapid hardening cement composition of the present invention and the cement composition containing the naphthalene dispersant showed almost the same fluidity. However, the ultrarapid hardening cement composition of the present invention showed the fluidity equal to that of the cement composition containing the naphthalene dispersant at a small dosage of the dispersant. That is, in this case, use of the dispersant of the present invention was much more excellent in effect of reducing dispersants.

(2) Initial Strength Exhibiting Property

In the ultrarapid hardening cement composition of the present invention, the compressive strength was gradually improved by reducing the water/cement ratio to 38%, 34%, and 30%.

Example 7 and Comparative Example 12

"Performance Evaluation Test"

The cement compositions were subjected to performance evaluation test in the same manner as in Example 2, except that the test was performed at an ambient temperature of 5° C.

Table 3 shows the kind and the dosage of the dispersant, the dosage of the retarding agent, and the measurement results in the ultrarapid hardening cement compositions of the present invention and Comparative Example.

TABLE 3

| | Dispersant | | Retarding agent | | Compressive strength |
|---|---|---|---|---|---|
| | Kind | Dosage (C × %) | Dosage (C × %) | Flow (mm) | (N/mm²) |
| Example 7 | Polyacrylic acid dispersant 1 | 0.6 | 0.05 | 280 | 22.4 |
| Comparative Example 12 | Naphthalene dispersant | 2.0 | 0.05 | 270 | 10.3 |

"Explanation of Performance Evaluation Test Results"

(1) Fluidity

The ultrarapid hardening cement composition of the present invention could secure all most the same fluidity as that of the cement composition containing the conventional naphthalene dispersant, at a small dosage of the dispersant.

(2) Initial Strength Exhibiting Property

The compressive strength of material age of 3 hours was remarkably increased in the ultrarapid hardening cement composition of the present invention, as compared with the composition containing the naphthalene dispersant under the condition that the compositions contained the same amount of the retarding agent and showed the same initial fluidity.

Example 8 and Comparative Example 13

"Performance Evaluation Test"

A concrete test was performed in a compounding mentioned below and under the following conditions at a normal temperature (20° C.)
Tap water: 160 kg/m³
Cement (jet cement): 400 kg/m³
Fine aggregate (river sand from Yasu, Shiga): 748 kg/m³
Coarse aggregate (crushed stone from Takatsuki, Osaka): 1074 kg/m³

The cement and the aggregates were dry-mixed for 30 seconds with a pan mixer and then, thereinto was added water, and the mixture was kneaded for 120 seconds.

Table 4 shows the kind and the dosage of the dispersant, the dosage of the retarding agent, and the measurement results in the cement compositions of the present invention and Comparative Examples.

The cement composition having a compounding shown in Table 4 was evaluated for initial strength exhibiting property in the same manner as mentioned above.

"Explanation of Performance Evaluation Test Results"

(1) Fluidity Retention

The fluidity retention in the ultrarapid hardening cement composition of the present invention was excellent because the slump hardly changed over time and no stiffness at the settlement occurred, as compared with the cement composition containing the naphthalene dispersant.

(2) Initial Strength Exhibiting Property

The ultrarapid hardening cement composition of the present invention and the cement composition containing the naphthalene dispersant showed almost the same compressive strengths of material age of 3 hours.

INDUSTRIAL APPLICABILITY

The ultrarapid hardening cement composition and the dispersant for ultrarapid hardening cement compositions of the present invention have the above-mentioned configurations. The composition and the dispersant have excellent usable time and initial strength exhibiting property as well as excellent fluidity under low temperature atmosphere as well as usual temperature atmosphere, and also they can improve the workability while retaining the rapid hardenability, and can enhance strength and durability of the hardened product.

The invention claimed is:

1. A method of using an ultrarapid hardening cement composition wherein the method comprises a step of kneading and placing the ultrarapid hardening cement composition at an ambient temperature of 15° C. or less, wherein the ultrarapid cement hardening composition comprises: an ultrarapid hardening cement (A) comprising a calcium aluminate; and a cement dispersant (B), wherein the cement dispersant (B) comprises a copolymer having: a repeating unit derived from a monomer represented by the following formula (1):

TABLE 4

| | Dispersant | | Additive | Retarding agent | Slump (cm) | | | | Compressive strength (N/mm²) | Stiffness at settlement | Air quantity (%) |
|---|---|---|---|---|---|---|---|---|---|---|---|
| | Kind | Dosage (C × %) | Dosage (C × %) | Dosage (C × %) | Immediate aftermath | 10 minutes | 20 minutes | 30 minutes | | | |
| Example 8 | Polyacrylic acid dispersant 2 | 1.0 | 0.1 | 0.25 | 11.3 | 10.6 | 10.9 | 11.1 | 23.3 | Not stiffed | 1.6 |
| Comparative Example 13 | Naphthalene dispersant | 20 | — | 0.25 | 11.5 | 9.1 | 5.7 | 3 | 23.5 | Much stiffed | 1.8 |

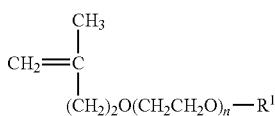

(1)

in the formula, $R^1$ being the same or different and each representing a hydrogen atom or an alkyl group containing 1 to 18 carbon atoms; n representing an average molar number of addition and being a number of 10 to 300; and a repeating unit derived from a monomer represented by the following formula (2):

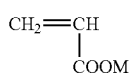

(2)

in the formula, M representing a hydrogen atom, a monovalent metal atom, a divalent metal atom, an ammonium group, or an organic amine group; wherein the ultrarapid hardening cement composition is produced by being kneaded at a water/the ultrarapid hardening cement (A) ratio of 35% by mass or less and wherein the mass ratio of the cement dispersant (B) to the ultrarapid hardening cement (A) is 0.01:100 to 8.0:100.

2. The method of using the ultrarapid hardening cement composition according to claim 1, wherein the calcium aluminate as a component of the ultrarapid hardening cement (A) comprises at least one main component selected from the group consisting of $C_{11}A_7 \cdot CaX_2$, $C_3A$, $CA$, $C_2AS$, $CA_2$, $C_3A_3 \cdot CaSO_4$, $C_{12}A_7$, $C_6AF_2$, $C_4AF$ (C representing CaO; A representing $Al_2O_3$; S representing $SiO_2$; S in $CaSO_4$ representing a sulfur atom; F representing $Fe_2O_3$; and X representing a halogen element), and amorphous calcium aluminates.

3. The method of using the ultrarapid hardening cement composition according to claim 1, wherein the ultrarapid hardening cement composition further comprises a retarding agent.

4. The method of using the ultrarapid hardening cement composition according to claim 3, wherein the retarding agent is an oxycarboxylic acid compound.

5. The method of using the ultrarapid hardening cement composition according to claim 1, wherein the ultrarapid hardening cement composition further comprises a compound prepared by adding an alkylene oxide to a polyalkylene imine.

6. The method of using the ultrarapid hardening cement composition according to claim 1, wherein the ultrarapid hardening cement composition is used for high strength cement paste, mortar, or concrete.

7. The method of using the ultrarapid hardening cement composition according to claim 2, wherein the ultrarapid hardening cement composition further comprises a retarding agent.

8. The method of using the ultrarapid hardening cement composition according to claim 2, wherein the ultrarapid hardening cement composition further comprises a compound prepared by adding an alkylene oxide to a polyalkylene imine.

9. An ultrarapid hardening cement composition used in the method of claim 1.

* * * * *

UNITED STATES PATENT AND TRADEMARK OFFICE
CERTIFICATE OF CORRECTION

| | | |
|---|---|---|
| PATENT NO. | : 8,076,396 B2 | Page 1 of 1 |
| APPLICATION NO. | : 12/065443 | |
| DATED | : December 13, 2011 | |
| INVENTOR(S) | : Akira Ono et al. | |

It is certified that error appears in the above-identified patent and that said Letters Patent is hereby corrected as shown below:

Title page, item (86), § 371 (c)(1), (2), (4) Date should read "May 12, 2008" instead of "Feb. 29, 2008".

Signed and Sealed this
Twenty-eighth Day of February, 2012

David J. Kappos
*Director of the United States Patent and Trademark Office*